(12) United States Patent
Dunham (10) Patent No.: US 9,523,860 B2
(45) Date of Patent: Dec. 20, 2016

(54) COLOR-CHANGING APPARATUS FOR ACTIVE CAMOUFLAGE CONFIGURATIONS

(71) Applicant: Emmett Dunham, Villa Park, IL (US)

(72) Inventor: Emmett Dunham, Villa Park, IL (US)

(*) Notice: Subject to any disclaimer, the term of this patent is extended or adjusted under 35 U.S.C. 154(b) by 135 days.

(21) Appl. No.: 14/515,832

(22) Filed: Oct. 16, 2014

(65) Prior Publication Data

US 2015/0355473 A1    Dec. 10, 2015

Related U.S. Application Data

(60) Provisional application No. 61/891,602, filed on Oct. 16, 2013.

(51) Int. Cl.
| | | |
|---|---|---|
| *G02F 1/1335* | (2006.01) | |
| *G02B 27/28* | (2006.01) | |
| *G02B 26/00* | (2006.01) | |
| *G09F 9/37* | (2006.01) | |
| *G09F 9/35* | (2006.01) | |
| *G09F 21/04* | (2006.01) | |

(52) U.S. Cl.
CPC .......... *G02B 27/281* (2013.01); *G02B 26/007* (2013.01); *G09F 9/35* (2013.01); *G09F 9/37* (2013.01); *G09F 21/04* (2013.01); *G09F 21/048* (2013.01)

(58) Field of Classification Search
CPC ... G02B 27/281; G02B 26/007; G02F 1/0136; G02F 1/13363; G02F 1/133528; G02F 2001/133638; G02F 2001/133531
USPC .......................................................... 349/96
See application file for complete search history.

(56) References Cited

U.S. PATENT DOCUMENTS

| | | | | |
|---|---|---|---|---|
| 5,264,964 | A | * 11/1993 | Faris | G02B 27/26 348/E13.022 |
| 5,488,496 | A | * 1/1996 | Pine | G02F 1/133308 349/58 |
| 5,999,316 | A | * 12/1999 | Allen | G02B 27/281 296/97.1 |

(Continued)

FOREIGN PATENT DOCUMENTS

JP         04328525 A  * 11/1992

OTHER PUBLICATIONS

"Karo Syrup and Polarized Light", YouTube video available at: https://www.youtube.com/watch?v=QCWJ6PtKtCQ, 38 seconds in length, uploaded on Jun. 9, 2009, last accessed on Jan. 15, 2015.

*Primary Examiner* — Hoan C Nguyen
(74) *Attorney, Agent, or Firm* — Gregory A. Lewis; Price Heneveld, LLP (57) ABSTRACT

A color-changing array that includes a mounting substrate; a plurality of color-changing panels attached to the mounting substrate; and a top polarization layer arranged over, and adapted to move relative to, the plurality of color-changing panels. Each color-changing panel includes: (a) a transparent substrate with a bottom surface and a top surface, (b) a bottom polarization film arranged on the bottom surface of the transparent substrate, (c) a liquid crystal region comprising anisotropic liquid crystal material and configured over the top surface of the transparent substrate, and (d) an optical retardation film arranged over the liquid crystal region and above the top surface. Further, movement of the top polarization layer to a plurality of predetermined positions results in a plurality of corresponding, predetermined visible optical patterns.

13 Claims, 5 Drawing Sheets

(56) References Cited

U.S. PATENT DOCUMENTS 6,456,345 B1 * 9/2002 Ise .................... G02F 1/133528
349/74

* cited by examiner

COLOR-CHANGING APPARATUS FOR ACTIVE CAMOUFLAGE CONFIGURATIONS

CROSS-REFERENCE TO RELATED APPLICATION

This application claims the benefit of priority under 35 U.S.C. §119 of U.S. Provisional Application Ser. No. 61/891,602 filed on Oct. 16, 2013, the contents of which is relied upon and incorporated herein by reference in its entirety.

BACKGROUND

The present invention generally relates to color-changing and pattern-changing apparatus and, more particularly, to active camouflage configurations for use in hunting, military, artistic and other related endeavors.

Recently developed active camouflage techniques incorporated into vehicles, for example, rely on digital cameras, active matrix displays (e.g., LCD screens), a central processor, and significant power supply sources. In these systems, the camera is used to transmit images of the environment of the vehicle to a processor in real-time. The process can then manipulate the display to produce a variable image that effectively camouflages the vehicle as a function of visual information received from the camera. Such systems are costly, elaborate and rely on significant power usage. In more demanding environments, such as in military applications, such systems may not be reliable, require components having too much weight (e.g., the power source), and/or are too costly to justify in terms of their benefits. As such, there is a need for active camouflage systems that are reliable, simple in terms of quantities of components, and use little energy in operation.

SUMMARY

According to one embodiment, a color-changing panel is provided that includes a transparent substrate with a bottom surface and a top surface; a bottom polarization film arranged on the bottom surface of the substrate; and a liquid crystal region comprising anisotropic liquid crystal material, configured over the top surface of the substrate. The panel further includes an optical retardation film arranged over the liquid crystal region and above the top surface; and a top polarization film arranged over the optical retardation film. The top polarization film is adapted to move relative to the bottom polarization film. Further, movement of the top polarization film to a first position results in a first visible optical pattern, and movement of the top polarization film to a second position results in a second visible optical pattern.

According to another embodiment, a color-changing panel is provided that includes a transparent substrate with a bottom surface and a top surface; a bottom polarization film arranged on the bottom surface of the substrate; and a liquid crystal region comprising anisotropic liquid crystal material, configured over the top surface of the substrate. The panel further includes an optical retardation film arranged over the liquid crystal region and above the top surface; and a top polarization film arranged over the optical retardation film. The top polarization film is adapted to rotate relative to the bottom polarization film. Further, rotation of the top polarization film to a first position results in a first visible optical pattern, and rotation of the top polarization film to a second position results in a second visible optical pattern.

According to a further embodiment, a color-changing array is provided that includes a mounting substrate; a plurality of color-changing panels attached to the mounting substrate; and a top polarization layer arranged over, and adapted to move relative to, the plurality of color-changing panels. Each color-changing panel includes: (a) a transparent substrate with a bottom surface and a top surface, (b) a bottom polarization film arranged on the bottom surface of the transparent substrate, (c) a liquid crystal region comprising anisotropic liquid crystal material and configured over the top surface of the transparent substrate, and (d) an optical retardation film arranged over the liquid crystal region and above the top surface. Further, movement of the top polarization layer to a plurality of predetermined positions results in a plurality of corresponding, predetermined visible optical patterns.

According to an additional embodiment, a color-changing array is provided that includes a mounting substrate; a plurality of color-changing panels attached to the mounting substrate; and a top polarization layer arranged over, and adapted to rotate relative to, the plurality of color-changing panels. Each color-changing panel includes: (a) a transparent substrate with a bottom surface and a top surface, (b) a bottom polarization film arranged on the bottom surface of the transparent substrate, (c) a liquid crystal region comprising anisotropic liquid crystal material, configured over the top surface of the transparent substrate, and (d) an optical retardation film arranged over the liquid crystal region and above the top surface. Further, rotation of the top polarization layer to a plurality of predetermined positions results in a plurality of corresponding, predetermined visible optical patterns.

According to a still further embodiment, a color-changing panel is provided that includes a transparent substrate with a bottom surface, a top surface and four edges; a bottom polarization film arranged on the bottom surface of the substrate; and a polarizable region that includes a plurality of polarizable particles configured over the top surface of the substrate. The particles are polarizable by an applied electric field. The panel further includes an optical retardation film arranged over the polarizable region and above the top surface of the substrate; a top polarization film arranged over the optical retardation film; and a plurality of electrodes configured in proximity to the polarizable region. The electrodes are adapted to generate a plurality of predetermined, applied electric fields over the polarizable region. Further, the plurality of predetermined electric fields results in a corresponding plurality of visible optical patterns.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one with ordinary skill in the art to variously employ the present invention.

Figure 1A:
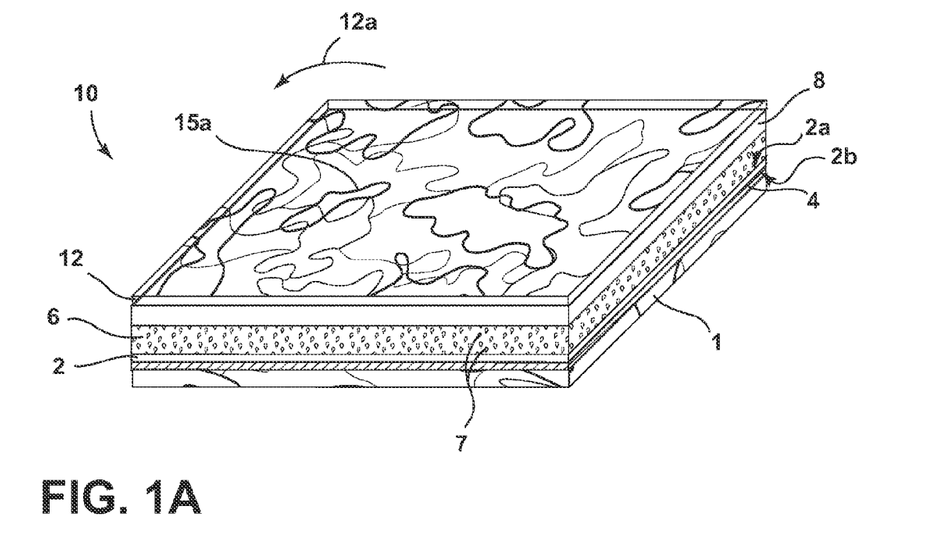
FIG. 1A is a perspective view of a color-changing panel according to one embodiment with the top polarization film in a first position.

For purposes of description herein, the terms "upper," "lower," "right," "left," "rear," "front," "vertical," "horizontal," and derivatives thereof shall relate to the components illustrated in FIG. 1A. However, it is to be understood that the invention may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
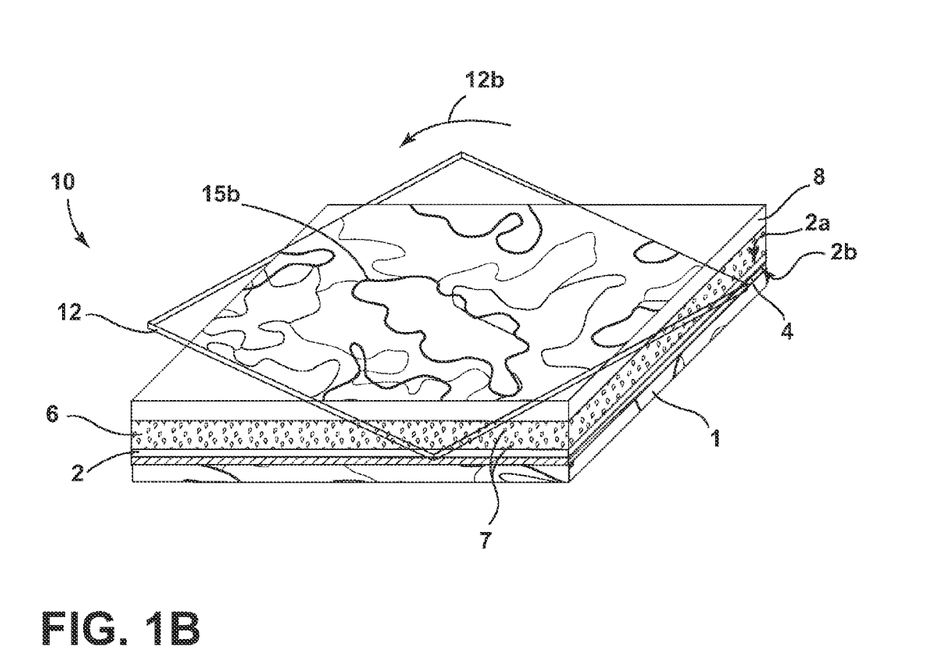
FIG. 1B is a perspective view of the color-changing panel depicted in FIG. 1A with the top polarization film in a second position.

Referring to FIGS. 1A and 1B, a color-changing panel 10 is depicted. The color-changing panel 10 includes a substrate 2 with top surface 2a and a bottom surface 2b. The substrate 2 should be substantially transparent and can be fabricated from a variety of glass, ceramics and glass-ceramics commonly employed in the display device industry.

The color-changing panel 10 also includes a bottom polarization film 4 arranged on the bottom surface 2b of the substrate 2. Preferably, the bottom polarization film 4 is attached to the bottom surface 2b by transparent glue or another optically transparent attachment material. Various materials, films and filters can be employed for bottom polarization film 4, provided that the selected material, film, layer or otherwise can polarize visible light wavelengths.

As also depicted in FIGS. 1A and 1B, the color-changing panel 10 includes a liquid crystal region 6 over the top and bottom surfaces 2a and 2b of the substrate 2. Liquid crystal region 6 includes liquid crystal material 7 and, in some aspects, a medium for containing the material 7. The liquid crystal material 7 should be anisotropic in terms of its light refracting properties. Further, the liquid crystal region 6 should be contained or otherwise sealed with a frame, container or other suitable means (not shown) above top surface 2a to ensure that the liquid crystal material 7 does not leak from the color-changing panel 10. Various materials can be employed for liquid crystal material 7, including those known by those with ordinary skill in the art, from the field of liquid crystal display devices, provided that they have anisotropic and/or color-changing optical properties. In some aspects, the liquid crystal material 7 can include a substantially clear corn syrup (e.g., Karo® Corn Syrup). In an additional aspect, a substantially clear corn syrup (e.g., Karo® Corn Syrup) can be substituted for the liquid crystal material within the color-changing panel 10. Further, liquid crystal material 7 can be selected to produce various, pre-selected patterns for a viewer situated above color-changing panel 10 to observe when the color-changing panel 10 is subjected to ambient lighting conditions.

Color-changing panel 10 further includes an optical retardation film 8 arranged over the liquid crystal region 6. The optical retardation film 8 can be attached directly to the container, frame or other encapsulation associated with the liquid crystal region 6 within the color-changing panel 10. Optical retardation film 8 is preferably chosen from the set of waveguide films, filters and other devices having optical retardation properties as understood by those with ordinary skill in the operative field. Further, it should be understood that optical retardation film 8 is oriented above the top and bottom surfaces 2a and 2b of the substrate 2, as depicted in FIGS. 1A and 1B.

As also shown in FIGS. 1A and 1B, a top polarization film 12 is configured over the optical retardation film 8 within the color-changing panel 10. Preferably, the top polarization film 12 is attached to the optical retardation film 8 by transparent glue or another optically transparent attachment material. Various materials, films and filters can be employed for top polarization film 12, provided that the selected material, film, layer or other similar or like structure can polarize visible light wavelengths. In some embodiments, top polarization film 12 is a film that also exhibits optical retardation properties. When film 12 is configured with optical retardation properties, optical retardation film 8 is optional.

Top polarization film 12 is further configured to move relative to the other elements of the color-changing panel 10, including bottom polarization film 4. In particular, top polarization film 12 can slide, rotate or otherwise move above the other elements in the color-changing panel 10. It is this movement of top polarization film 12 that produces a visible, color-changing effect that can be observed from color-changing panel 10. In particular, the movement of top polarization film 12 relative to the polarization film 4 effectively produces a change in what is visually perceived by a viewer from a vantage point above the color-changing panel 10.

As shown in FIG. 1A, for example, top polarization film 12 can be configured such that it is coincident with optical retardation film 8, liquid crystal region 6, bottom polarization film 4 and substrate 2. When top polarization film 12 is oriented in this initial position 12a, a viewer can observe a first visible optical pattern 15a through the color-changing panel 10.

The visible optical pattern 15a depends on the materials selected for the substrate 2, bottom polarization film 4, liquid crystal material 7, optical retardation film 8 and top polarization film 12. In particular, the choice of liquid crystal material 7 can largely affect the overall pattern observed by a viewer from above the color-changing panel 10. The materials selected for substrate 2, bottom polarization film 4, liquid crystal material 7, optical retardation film 8 and top polarization film 12 can be chosen specifically for the purpose of developing a desired pattern for visible optical pattern 15a. In some aspects, the desired pattern is configured to develop a particular camouflage application (e.g., a desert motif, jungle motif, rain forest motif, etc.). Accordingly, the term "color-changing panel" as used herein refers to panels with color-changing and/or pattern-changing capabilities.

Referring to FIG. 1B, the top polarization film 12 can slide, rotate, or otherwise move to another position 12b relative to the optical retardation film 8, liquid crystal region 6, bottom polarization film 4 and substrate 2. When top polarization film 12 is oriented in this second position 12b, a viewer can observe a second visible optical pattern 15b through the color-changing panel 10. As such, the movement of top polarization film 12 relative to the elements beneath it in the color-changing panel 10 produces a change in the optical patterns observed by a viewer at a vantage point above the color-changing panel 10. As depicted in FIGS. 1A and 1B, these changed optical patterns are reflected in the visible optical patterns 15a and 15b associated with the positions 12a and 12b of the top polarization film 12.

In some implementations, a user can purposely move top polarization film 12 relative to the elements beneath it in the color-changing panel 10 for the purpose of developing a changing optical pattern observable by those with a vantage point above the color-changing panel 10. It is also possible to configure top polarization film 12 such that it can move to numerous, discrete positions (e.g., 9 positions reflecting a 10 degree rotation for each position) relative to the elements beneath it in color-changing panel 10. As such, the color-changing panel 10 can be configured to possess settings allowing a user to produce various visible camouflage patterns with the mere movement of top polarization film 12 relative to the other elements in color-changing panel 10.

In an additional embodiment, also depicted in FIGS. 1A and 1B, color-changing panel 10 can include a fixed color pattern 1 arranged below the bottom polarization film 4. Fixed color pattern 1 can then be observed by a viewer at a vantage point above the color-changing panel 10, through the substrate 2, polarization films 4 and 12, etc. For example, fixed color pattern 1 can be configured, and thus viewed, as patterns 15a and 15b, depending on whether top polarization film 12 has been moved to position 12a or 12b.

Figure 2A:
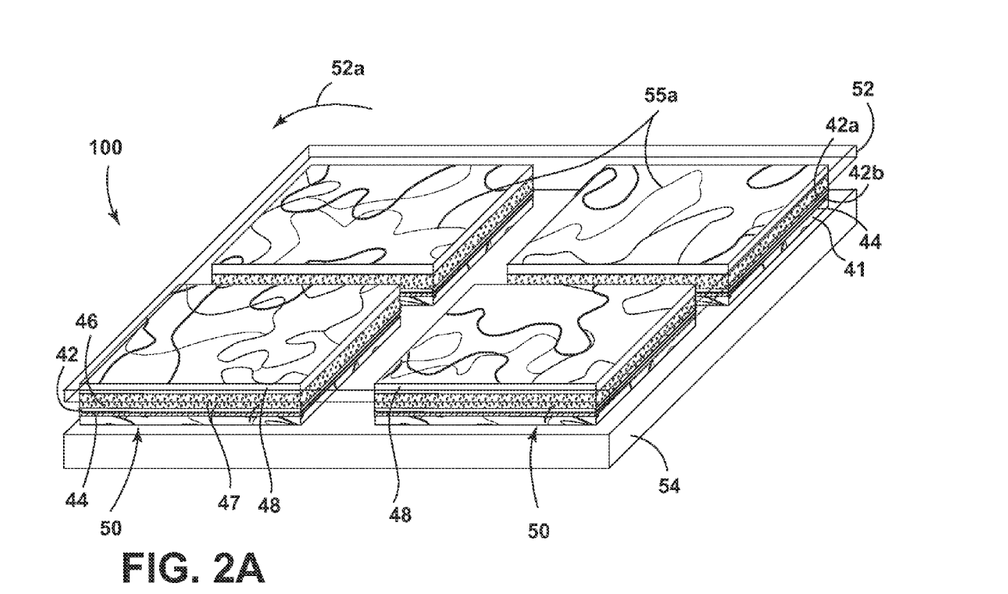
FIG. 2A is a perspective view of a color-changing array according to another embodiment with the top polarization film in a first position.
Figure 2B:
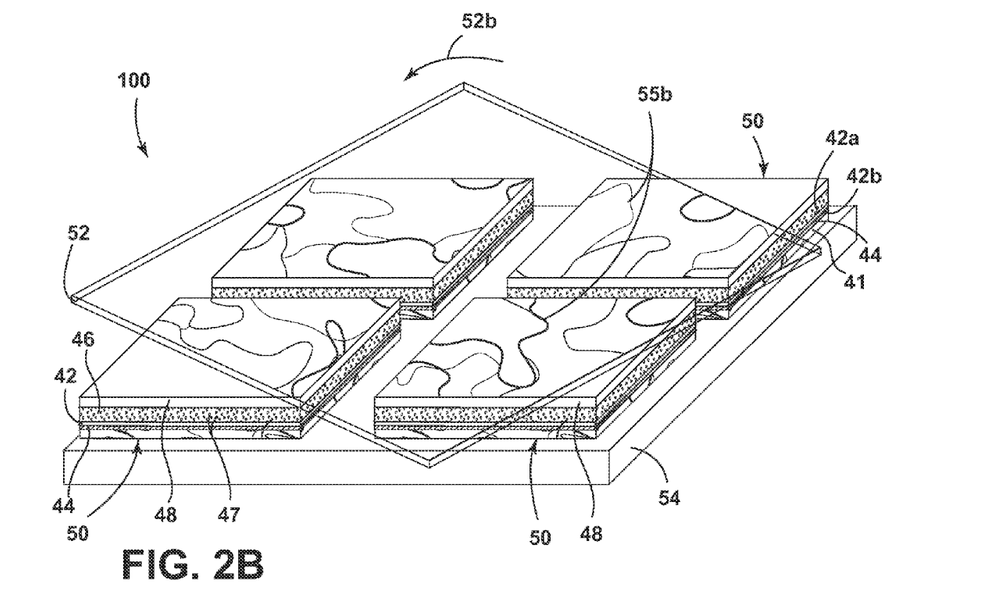
FIG. 2B is a perspective view of the color-changing array depicted in FIG. 2A with the top polarization film in a second position.

Referring to FIGS. 2A and 2B, a color-changing array 100 is depicted. The color-changing array 100 includes a mounting substrate 54 and a set of color-changing panels 50 attached to the mounting substrate 54. Each color-changing panel 50 is configured identically to the color-changing panels 10 described in connection with FIGS. 1A and 1B, except each panel 50 does not contain its own top polarization film. In particular, color-changing panels 50 include; a transparent substrate 42 with a top surface 42a and bottom surface 42b; a bottom polarization film 44 arranged on the bottom surface 42b of the transparent substrate 42; a liquid crystal region 46 having liquid crystal material 47, configured over the top and bottom surfaces 42a and 42b of the transparent substrate 42; and an optical retardation film 48 arranged over the liquid crystal region 46 and above the top surface 42a of the transparent substrate 42. These features and elements of color-changing panel 50 operate the same as, and are comprised of materials comparable to, the similarly-identified elements of color-changing panel 10.

As noted above, each color-changing panel 50 does not each possess its own top polarization film, comparable to the top polarization film 12 employed in color-changing panels 10. Instead, a single top polarization layer 52 is employed above each of the color-changing panels 50 attached to the mounting substrate 54 in the color-changing array 100. As such, movement of top polarization layer 52 to positions 52a, 52b (see FIGS. 2A and 2B, respectively), or other positions relative to the elements of color-changing panels 50 beneath the top polarization layer 52, produces multiple visible optical patterns. As such, top polarization layer 52 is adapted to move relative to the set of color-changing panels 50 mounted or otherwise attached to the mounting substrate 54.

In an additional embodiment, also depicted in FIGS. 2A and 2B, each color-changing panel 50 employed in color-changing array 100 can include a fixed color pattern 41 arranged below the bottom polarization film 44. Fixed color pattern 41 can then be observed by a viewer at a vantage point above the color-changing panel 50, through the transparent substrate 42, bottom polarization film 44 and top polarization layer 52, etc. For example, fixed color pattern 41 can be configured, and thus viewed, as patterns 55a or 55b as a function of the position of top polarization layer 52, e.g., positions 52a or 52b (or other position).

The optical patterns produced by the movement of top polarization layer 52 in the color-changing array 100 include optical patterns 55a and 55b, corresponding to positions 52a and 52b. It should also be understood that the elimination of optical retardation film 48 in certain panels 50 can produce "dead pixels" within the array 100 according to a further embodiment. Movement of the top polarization layer 52 can then produce dark or light spots in array 100 corresponding to those panels 50 lacking a retardation film 48.

In effect, movement of top polarization layer 52 above the color-changing panels 50 within color-changing array 100 simultaneously changes the visible optical patterns associated with each color-changing panel 50 observed by a viewer at a vantage point above the color-changing array 100. With the color-changing array 100, a designer can individually design and orient each color-changing panel 50 on the mounting substrate 54 such that each panel 50 can individually produce different optical patterns that change with the movement of top polarization layer 52. As such, the elements (e.g., liquid crystal material 47) of the panels 50 and the arrangement of the panels 50 on the mounting substrate 54 can both be adjusted to produce different visible patterns that change in appearance with the mere movement of top polarization layer 52.

The top polarization film 12 in color-changing panel 50 (see FIGS. 1A and 1B) and top polarization layer 52 in color-changing array 100 (see FIGS. 1A and 1B) can be moved on or within a plane above the elements beneath them by a variety of approaches. For example, top polarization film 12 and top polarization layer 52 could be configured in track-like assemblies such that a user can mechanically move them to produce optical patterns 15a, 15b, 55a and 55b, respectively. Other mechanical approaches as readily understood by those with skill in the field can also be used to effect such movement of top polarization film 12 and layer 52 within panel 50 and array 100, respectively.

Figure 3:
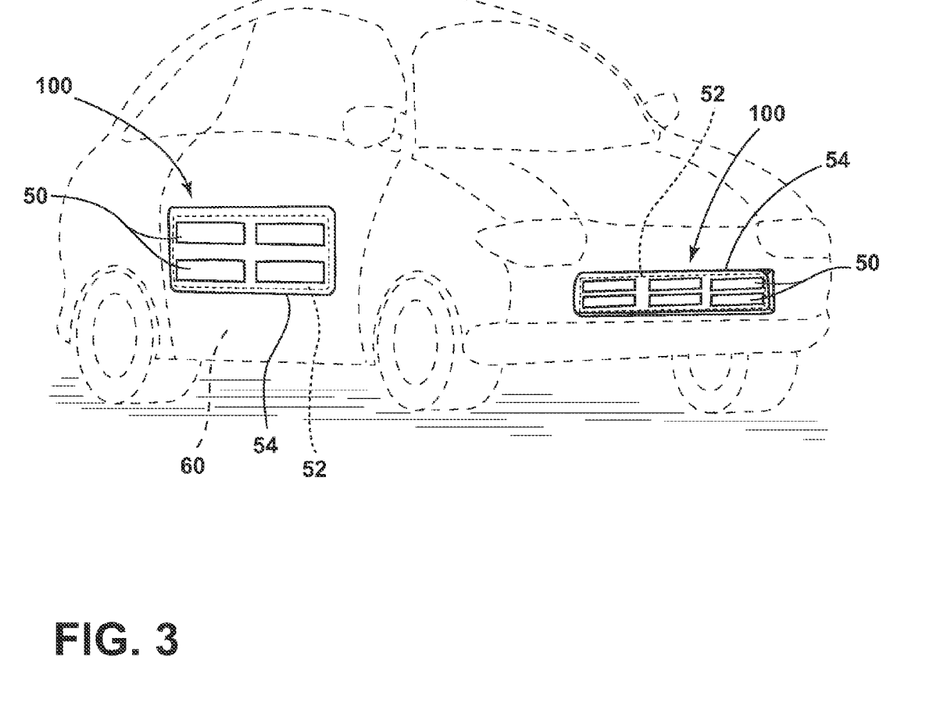
FIG. 3 is a perspective view of a color-changing array mounted on a vehicle according to a further embodiment.

As depicted in FIG. 3, color-changing arrays 100 can be affixed at various locations on a vehicle 60 according to another embodiment. In particular, the color-changing arrays 100 can be affixed to body panel regions, bumper regions and other locations on the vehicle by securing the mounting substrates 54 of the arrays 100 to these portions of the vehicle 60. These arrays 100 can be configured on the vehicle 60 such that their top polarization layers 52 can be moved, rotated or otherwise adjusted to produce various optical patterns, e.g., patterns 55a and 55b (see FIGS. 2A and 2B). These optical patterns, which change as a function of movement of the top polarization layer 52, are visible to an observer outside of the vehicle 60 and facing one or more of the arrays 100. When color-changing arrays 100 are employed in this fashion, various camouflage patterns can be produced by the user with the simple movement of the top polarization layer 52, according to some aspects of this disclosure. For example, color-changing arrays 100 could be configured (e.g., through choice of liquid crystal material 47, fixed color pattern 41, etc.) to produce desert and temperate region optical pattern motifs that could be changed by a user for purposes of camouflaging the vehicle 60 when operated within these environments.

Figure 4:
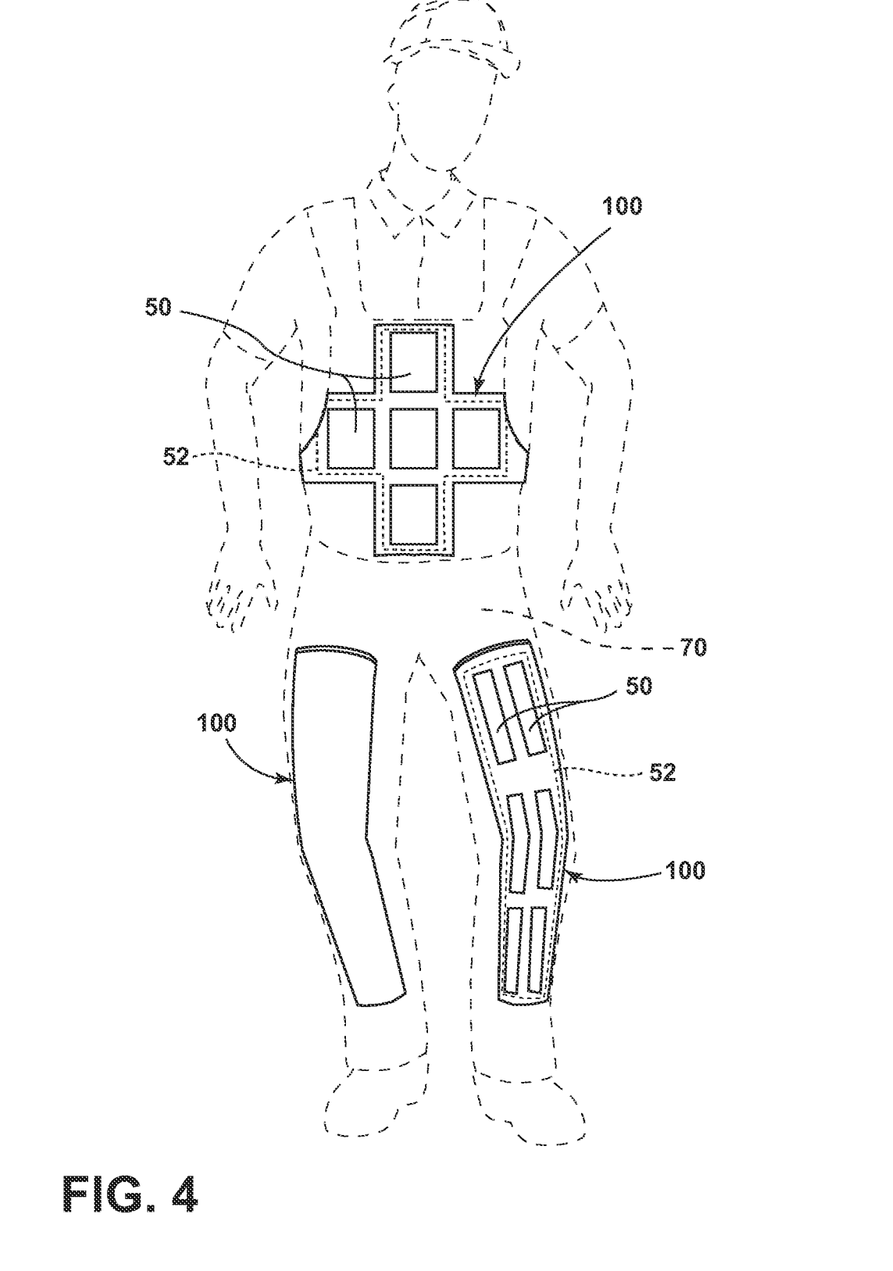
FIG. 4 is a perspective view of a color-changing array mounted on a uniform according to an additional embodiment.

Referring to FIG. 4, color-changing arrays 100 can be affixed at various locations on the exterior of a uniform 70 worn on an individual according to a further embodiment. These color-changing arrays 100 can be affixed to various portions of the uniform 70 including a helmet, leggings, torso, arms, boots, etc. These arrays 100 can be configured on the uniform 70 such that their top polarization layers 52 can be moved, rotated or otherwise adjusted to produce various optical patterns, e.g., patterns 55a and 55b (see FIGS. 2A and 2B). These optical patterns, which change as a function of movement of the top polarization layer 52, are visible to an observer outside of the uniform 70 and facing one or more of the arrays 100. When color-changing arrays 100 are employed in this fashion, various camouflage patterns can be produced by the wearer of the uniform 70 with the simple movement of the top polarization layer 52 within each array 100. For example, color-changing arrays 100 could be configured (e.g., through choice of liquid crystal material 47, fixed color pattern 41, etc.) to produce desert and temperate region optical pattern motifs that could be changed by a user for purposes of camouflaging an individual wearing the uniform 70 containing the color-changing arrays 100. In these configurations, color-changing arrays 100 are particularly advantageous in that they can be adjusted with minimal effort by the wearer of the uniform 70, requiring no additional electrical energy usage or energy storage devices, for example.

Figure 5:
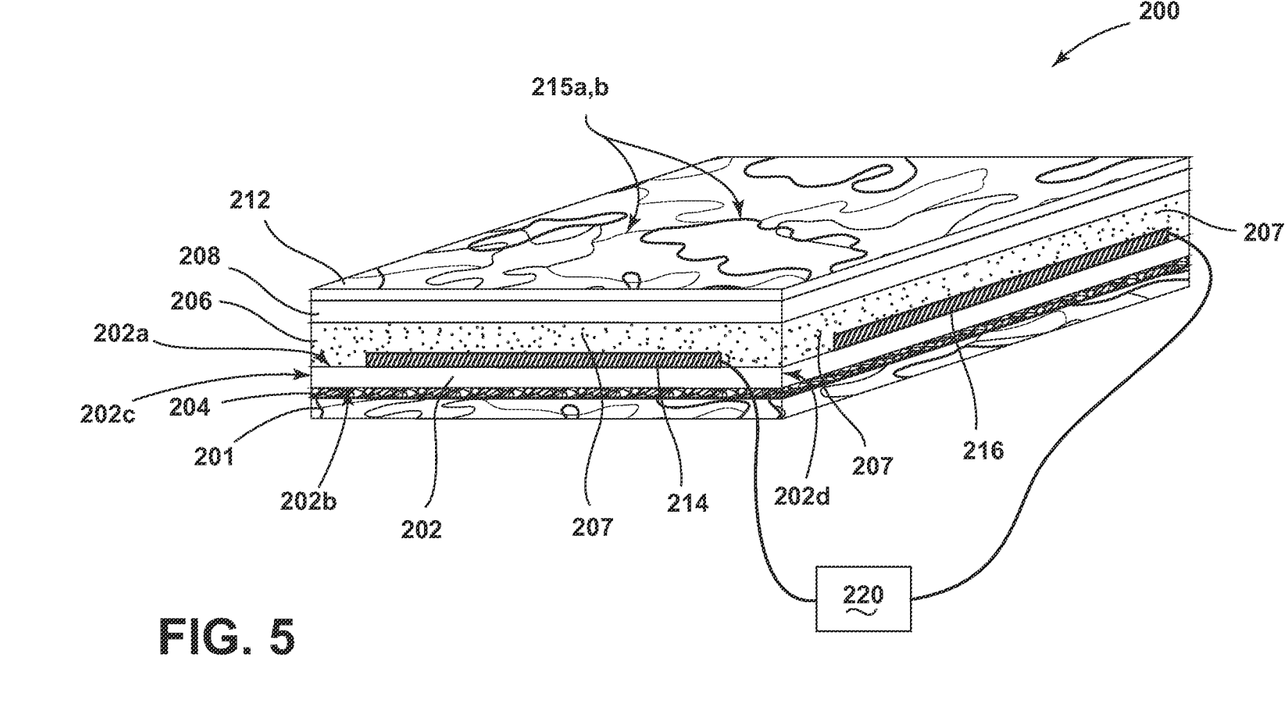
FIG. 5 is a perspective view of a color-changing panel with a polarizable region having a plurality of polarizable particles according to another embodiment.

Referring to FIG. 5, a color-changing panel 200 is depicted according to a further embodiment. Each color-changing panel 200 is configured similarly to the color-changing panels 10 described in connection with FIGS. 1A and 1B. In particular, color-changing panels 200 include: a transparent substrate 202 with a top surface 202a and bottom surface 202b; a bottom polarization film 204 arranged on the bottom surface 202b of the transparent substrate 202; and a polarizable region 206 having a plurality of polarizable particles 207, both configured over the top surface 202a of the transparent substrate 202. The particles 207 are polarizable by an applied, external electric field (not shown). Further, the panels 200 include an optical retardation film 208 arranged over the polarizable region 206 and above the top and bottom surfaces 202a and 202b of the transparent substrate 202; and a top polarization film 212 arranged over the optical retardation film 208.

The color-changing panels 200 depicted in FIG. 5 also include a plurality of electrodes, e.g., electrodes 214 and 216, configured in proximity to the polarizable region 206. Preferably, the electrodes 214 and 216 are arranged adjacent to a first edge 202c and second edge 202d of the transparent substrate 202, respectively. The electrodes 214, 216 are further configured to generate a plurality of applied electric fields. For example, as shown in FIG. 5, electrodes 214, 216 can be coupled to a controller 220 (with a power source not shown) configured to control the electrodes 214, 216 to generate a plurality of predetermined electric fields over the polarizable region.

Each predetermined electric field generated by the electrodes 214, 216 can have a different magnitude and vector. Further, the applied electric fields over the polarizable region 206 can change the orientation of the polarizable particles 207 based on the magnitude and vector associated with the field. In turn, the change in polarization of the particles 207 changes the optical pattern, e.g., patterns 215a, 215b, that can be viewed by an observer at a vantage point above the panel 200. In effect, predetermined electric fields associated with electrodes 214, 216 and controller 220, for example, can correspond to particular, observable optical patterns, e.g., 215a, and 215b.

In an additional embodiment, also depicted in FIG. 5, each color-changing panel 200 can include a fixed color pattern 201 arranged below the bottom polarization film 204. Fixed color pattern 201 can then be observed by a viewer at a vantage point above the color-changing panel 200, through the substrate 202, polarization film 204 and polarization film 212, etc. For example, fixed color pattern 201 can be viewed as patterns 215a or 215b as a function of the electric field applied by electrodes 214, 216 to the polarizable particles 207.

In some embodiments, color-changing panel 200 provides a camouflage function similar to the panels 10 and 50 outlined earlier. Further, it should be understood that panels 200 can be incorporated into color-changing arrays comparable to array 100. As such, the panels 200 can be employed for use on a vehicle 60 (see FIG. 3) or uniform 70 (see FIG. 4). Advantageously, panels 200 can be employed to provide a large quantity of optical patterns (e.g., patterns 215a, 215b) based on the configuration of the electrodes 214, 216 and controller 220 to produce applied electric fields of various magnitudes and vectors that change the polarization state of polarizable particles 207. For some applications, the additional power usage required of panels 200 is offset by the ability of panels 200 to produce many more optical patterns compared to other color-changing panel embodiments (e.g., color-changing panels 10 and panels 50).

It will be apparent to those skilled in the art that various modifications and variations can be made to the foregoing aspects of the invention without departing from the spirit or scope of the claims.

What is claimed is:

1. A color-changing array, comprising:
   a mounting substrate;
   a plurality of color-changing panels attached to the mounting substrate; and
   a top polarization layer arranged over, and adapted to move relative to, the plurality of color-changing panels,
   wherein each color-changing panel comprises: (a) a transparent substrate with a bottom surface and a top surface, (b) a bottom polarization film arranged on the bottom surface of the transparent substrate, (c) a liquid crystal region comprising anisotropic liquid crystal material and configured over the top surface of the transparent substrate, and (d) an optical retardation film arranged over the liquid crystal region and above the top surface, and
   further wherein movement of the top polarization layer to a plurality of predetermined positions results in a plurality of corresponding, predetermined visible optical patterns.

2. The color-changing array according to claim 1, wherein the mounting substrate is affixed to a uniform.

3. The color-changing array according to claim 1, wherein the mounting substrate is affixed to a vehicle.

4. The color-changing array according to claim 1, wherein the array is further configured to camouflage an object.

5. The color-changing array according to claim 1, wherein the array is further configured to camouflage a living being.

6. The color-changing array according to claim 1, further comprising:
a fixed color pattern below the bottom polarization film.

7. The color-changing array according to claim 1, wherein the top polarization layer is further adapted to rotate relative to the plurality of color-changing panels and the movement of the top polarization layer is rotational.

8. The color-changing array according to claim 7, wherein the mounting substrate is affixed to a uniform.

9. The color-changing array according to claim 7, wherein the mounting substrate is affixed to a vehicle.

10. The color-changing array according to claim 7, wherein the array is further configured to camouflage an object.

11. The color-changing array according to claim 7, wherein the array is further configured to camouflage a living being.

12. The color-changing array according to claim 7, further comprising:
a fixed color pattern below the bottom polarization film.

13. The color-changing array according to claim 7, wherein the plurality of corresponding, predetermined visible optical patterns comprise climatological motifs.

* * * * *